United States Patent
Phillips et al.

(10) Patent No.: US 11,367,270 B2
(45) Date of Patent: Jun. 21, 2022

(54) RECOGNITION APPARATUS AND METHOD

(71) Applicant: Arm IP Limited, Cambridge (GB)

(72) Inventors: Amyas Edward Wykes Phillips, Cambridge (GB); Hugo John Martin Vincent, Cambridge (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/938,140

(22) Filed: Jul. 24, 2020

(65) Prior Publication Data

US 2021/0027089 A1 Jan. 28, 2021

(30) Foreign Application Priority Data

Jul. 26, 2019 (GB) .................................... 1910690

(51) Int. Cl.
*G06V 10/44* (2022.01)
*G06K 7/10* (2006.01)
*G06V 10/10* (2022.01)
*G06V 20/52* (2022.01)

(52) U.S. Cl.
CPC ......... *G06V 10/44* (2022.01); *G06K 7/10861* (2013.01); *G06V 10/10* (2022.01); *G06V 20/52* (2022.01)

(58) Field of Classification Search
None
See application file for complete search history.

(56) References Cited

U.S. PATENT DOCUMENTS

| 2012/0057032 A1* | 3/2012 | Jang | G06K 9/228 348/207.1 |
| 2014/0172290 A1* | 6/2014 | Prokhorov | G01C 21/28 701/408 |
| 2015/0365634 A1* | 12/2015 | Lin | G06K 9/66 348/143 |
| 2017/0091504 A1* | 3/2017 | Tonnelier | G06K 7/1417 |

FOREIGN PATENT DOCUMENTS

| CN | 109933679 | 6/2019 |
| EP | 2 426 623 | 3/2012 |

OTHER PUBLICATIONS

Search Report for GB1910690.5, dated Jan. 7, 2020, 3 pages.

* cited by examiner

*Primary Examiner* — Delomia L Gilliard
(74) *Attorney, Agent, or Firm* — Nixon & Vanderhye P.C.

(57) ABSTRACT

A method of identifying an object within an environment is described for capturing visual data associated with the environment and comparing data defining a candidate object in the environment with an object data store storing object templates providing data pertaining to one or more objects; responsive to matching the data defining the candidate object in the environment and an object template, identifying the candidate object; and responsive to failing to match data representing the candidate object in the environment with an object template, identifying one or more object identifiers disposed in the environment to define identifier search data, and using the identifier search data to interrogate a further object data store to identify the candidate object.

21 Claims, 6 Drawing Sheets

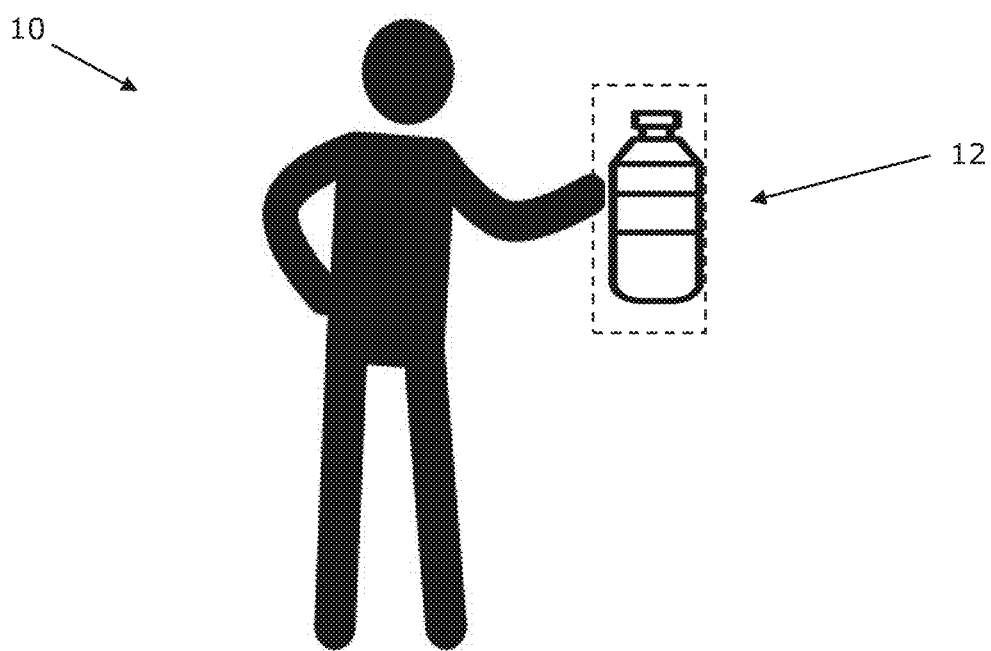
FIGURE 1
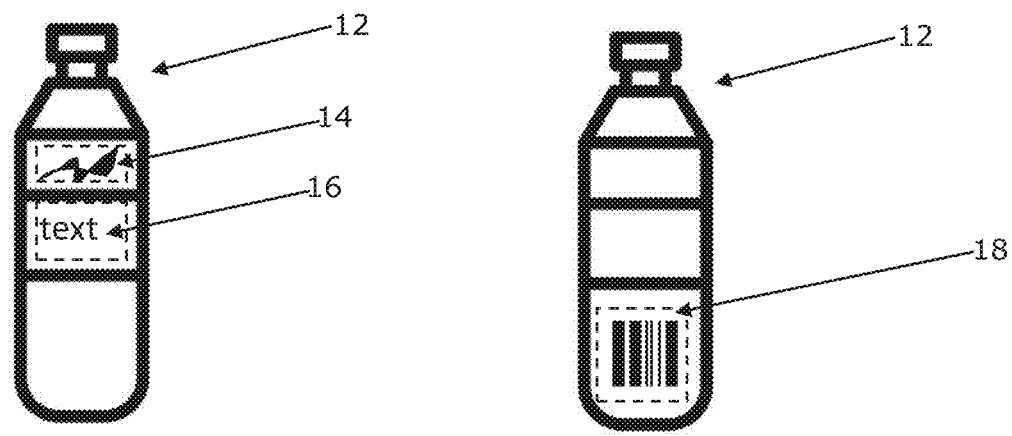
FIGURE 2a (front)   FIGURE 2b (back)

RECOGNITION APPARATUS AND METHOD

This application claims priority to GB Patent Application No. 1910690.5 filed 26 Jul. 2019, the entire contents of which is hereby incorporated by reference.

The present techniques relate to computer vision systems.

Computer vision systems process images (still or moving) to gain information about the real world. A computer vision system is required to acquire, process, analyse and understand digital images in order to extract data from the digital images. A computer vision system normally comprises one or more image acquisition devices, such as cameras, for obtaining the digital images.

In order to "understand" a digital representation of a scene, a computer vision system may detect low-level features that form objects within the image, for example by detecting lines, edges, ridges, corners, blobs, textures, shapes, gradients, regions, boundaries, surfaces, volumes, colours, shadings etc. The detected features are used to classify and locate objects and activities in an environment Computer vision systems may extract high-level symbolic information from image or video data that can be used by a software program to accomplish a task. Examples of high-level information include spatial models of the scene, lists of objects in the scene, identifications of unique objects in a scene, tracking of objects though a space, estimation of the motion of objects in a scene, detection of events in a scene, reference information concerning objects or activities in a scene, web APIs for interacting with objects in a scene, recognition of gestures. Example applications of this information include indexing, user interfaces, surveillance, augmented reality, text recognition, process control, inspection/diagnosis, navigation, sorting, tracking usage of objects, presence detection.

According to a first aspect there is provided a method of identifying an object within an environment comprising: capturing visual data associated with the environment and comparing data defining a candidate object in the environment with an object data store storing object templates providing data pertaining to one or more objects; responsive to matching the data defining the candidate object in the environment and an object template, identifying the candidate object; and responsive to failing to match data representing the candidate object in the environment with an object template, identifying one or more object identifiers disposed in the environment to define identifier search data, and using the identifier search data to interrogate a further object data store to identify the candidate object.

According to a second aspect there is provided a computer program product comprising computer code for performing the methods of the first aspect.

According to a third aspect there is provided an apparatus configured to perform the method of the first aspect.

Embodiments will now be described with reference to the accompanying figures of which:

FIG. 1 illustrates an image which has been acquired by a computer vision system;

FIG. 2A illustrates an enlarged view of the object 12 illustrated in FIG. 1;

FIG. 2B illustrates another enlarged view of the object 12 illustrated in FIG. 1;

Figure 3:
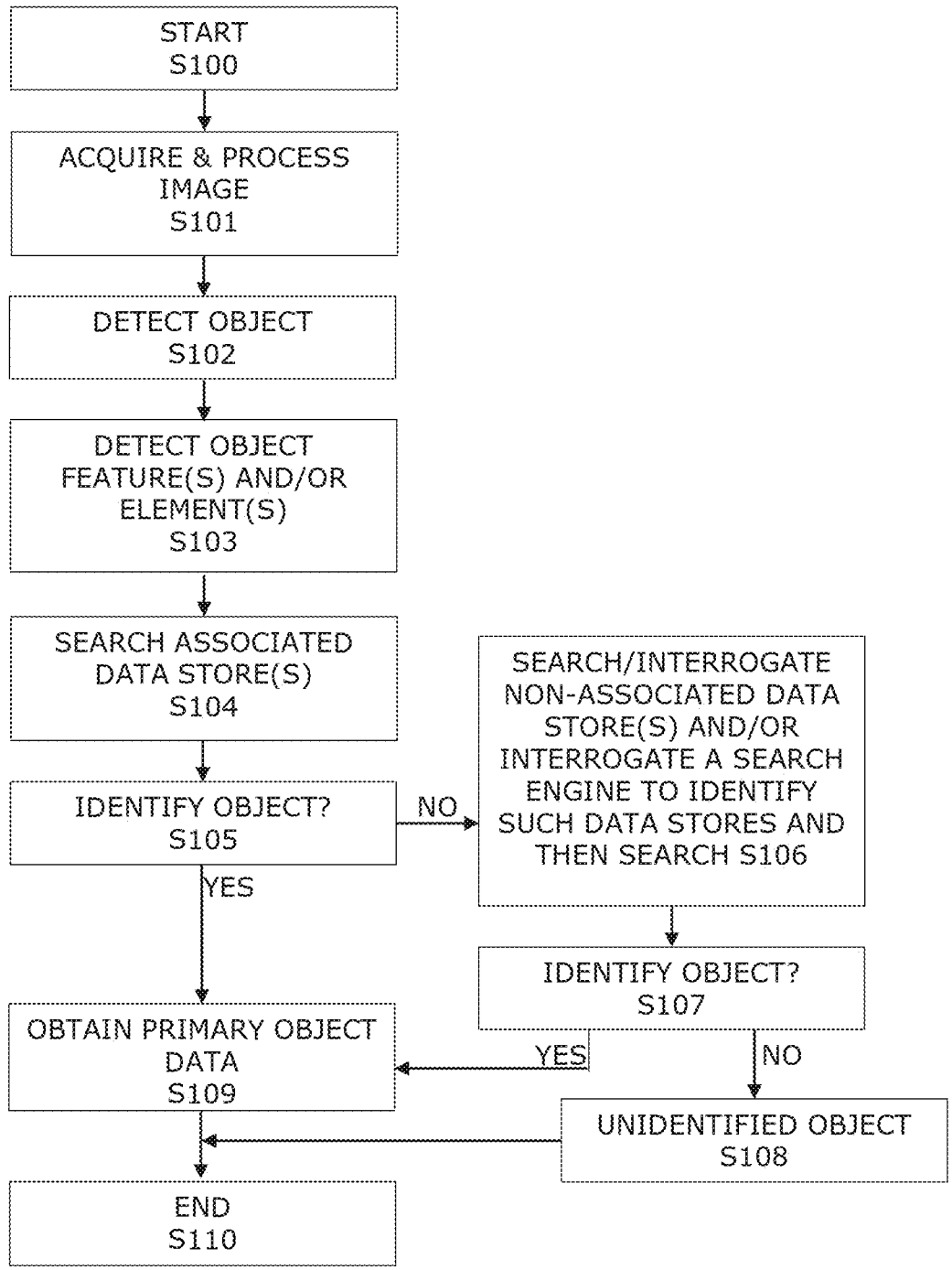
FIG. 3 illustrates a flow diagram of a method for identifying detected objects.

Computer vision tasks may be accomplished using a variety of methods. Tasks requiring object recognition may be solved by some variation on a process of comparing stored representations of objects of interest to elements in the scene and applying some rule for determining a match. The computer vision system uses a data store of pre-specified objects when trying to identify a detected object. For example, a computer vision system groups a set of features as a "candidate" object in the scene and then refers to the data store of pre-specified objects, or object templates incorporating data relating to one or more objects to identify a detected object. The data store of object templates is often called the modelbase. The data describing each object template may take a variety of forms including 3D models, neural network weights, sets of images, eigenimages or other forms. These templates may serve to identify objects specifically (e.g. my front door) or generally (e.g. a door), as required by the application. When no matching object template is in the modelbase, the computer vision system is unable to identify the detected object and a search is initiated for further templates, directly or indirectly (for example via a search engine) in other object data stores storing further object templates.

Although scene geometry and motion can be useful by itself, the extraction of higher-level symbolic information, and most applications of computer vision, rely on identifications of objects. Identifications enable the retrieval of further information and metadata such as web pages, Bluetooth APIs, names, 3D models, ownership information, permissions, maintenance information, price, reviews, handling methods, and interpretive or interrogative algorithms for condition, relationships and other properties of the object. FIG. 1 illustrates an example image 10 of a scene which has been acquired using one or more image acquisition devices, such as cameras, and provided to a computer vision system and which is to be processed by the computer vision system. The computer vision system processes the image 10 to detect a candidate object 12 within the scene, such as a commercially available product (e.g. a branded bottled product in this example). The system then searches one or more associated data stores of pre-specified object templates that, in some examples, form a modelbase and compares candidate object 12 to the pre-specified object templates to identify the detected candidate object 12. If a matching template is not found, further object data stores may be interrogated/searched.

An associated data store comprises pre-specified object templates, each comprising data for identifying different objects (the data often called exemplars) which may have been identified, using an object identifier, prior to the data store being used by the computer vision system. For example, the objects may have been identified by the manufacturer of the computer vision system and corresponding templates stored in a data store. Alternatively, the computer vision system may be provided with a modelbase for a specific set of objects that have been pre-defined in a separate, remote training phase and, for example, may be a specific set of objects that would typically be found in the environment being captured.

An associated data store of pre-specified object templates is associated with the computer vision system, in that the data for identifying different objects have been allocated or pre-configured for use by a computer vision system. For a given object, the object template data may comprise stored primary object data that identifies an object. Primary object data may be data that uniquely identifies an object such as object name, product serial number, or an International Standard Book Number (ISBN) reference. Alternatively, the primary object data may not uniquely identify the object and instead may identify a category or type of object, such as a product type or by brand.

For a given object, the object template data may also comprise object data used by the computer vision system to identify whether a candidate object matches the object defined by the object data. For example, object data for an object may comprise one or more of 3D models, neural network weights, sets of images, eigenimages or other forms.

The computer vision system detects one or more features which are grouped to attempt to identify within the scene/environment a candidate object 12. A feature is considered to be an inherent characteristic detectable within a scene that can be readily identified and combined in order to establish a candidate object within the scene, such as one or more of lines, edges, ridges, corners, blobs, textures, shapes, gradients, regions, boundaries, surfaces, volumes, colours, and shadings etc.

In addition or alternatively, the computer vision system detects one or more elements of a detected candidate object 12. The elements of a candidate object may comprise information relating to the object that can be used to assist in identification of an object. Some features of the object may be in the form of a distinct image, text, or machine-readable element that can aid in identification of the candidate object. Some elements of the candidate object may be used to identify a source of object data, such as an object template, associated with the candidate object. For example, an element of the object may be a computer vision code that can be interpreted by the computer vision system to provide the source of object data. An element of a detected candidate object may be a part of an object which can be isolated from the overall object characteristics. A non-exhaustive list of object elements comprises: images, text, machine-readable elements etc. A machine-readable element comprises a machine-readable representation of data. A non-exhaustive list of machine-readable elements comprises: one-dimensional barcodes, such as UPC barcodes and EAN barcodes; two-dimensional barcodes, such as QR codes and Data matrix codes; microchips; embedded microchips; URL's/website addresses etc.

FIGS. 2A and 2B illustrate enlarged views of the respective front and rear of the detected candidate object 12 of FIG. 1. The detected candidate object 12 has a logo 14 and text 16 on the front, as illustrated in FIG. 2A, and a barcode 18 on the back, as illustrated in FIG. 2B, which may be detected by the computer vision system as elements of the detected candidate object 12. The logo 14, text 16 and bar code 18 are each a part of the candidate object 12 but can be isolated from the overall object. Other elements of the candidate object 12 may be detected by the computer vision system.

FIG. 3 illustrates an example method for identifying an object. The method begins at step S100. At step S101, an image of the scene is acquired and optional pre-processing of the image is initiated. The computer vision system may include image acquisition devices, such as cameras, to acquire the images. The computer vision may instead acquire the images from a separate source, such as a remote camera. The pre-processing of the image may involve one of a number of processes including removing unwanted distortions such as noise or low-level feature enhancement such as hysteresis filtering.

At step S102, one or more elements or features are detected. This may involve processing the image to identify low-level features, such as edges. The low-level features may be processed to extract high-level features (e.g. more complex features) such as facial features.

The high-level features may be further processed at step S103, such as by using detection and segmentation algorithms and higher-level processing, until one or more candidate objects are identified. The precise nature of the processing performed at steps S102 and S103 will depend on the nature of the application for which the computer vision system is being used, such as environmental characteristics. In some arrangements, the process of steps S102 and S103 involve determining secondary object data for a candidate object, such as by determining neural network weights or eigen images for the candidate object.

At step S104, once data representing a candidate object has been identified at step S103, a search of the one or more associated data stores associated with the computer vision system is performed to identify an object template that matches the candidate object. To do this, data for the detected candidate object 12, is compared with the object templates of pre-specified objects stored in the associated data store to attempt to identify the detected candidate object. The computer vision system initiates a search of the at least one associated data store, based on data relating to a candidate object that has been derived from at least one detected feature of the detected candidate object 12 and optionally at least one detected element of the candidate object. For example, the computer vision system may conduct an search of the at least one associated data store, using the shape of the detected candidate object 12 (either including or excluding the colour(s) of the object 12), such that the overall shape of the detected candidate object 12 is compared with the object templates of the pre-specified objects stored in the associated data store. More generally, the computer vision system may perform a search of the object templates by comparing data relating to the candidate object with the secondary object data stored in the associated data store. Another example may be to use the colour of the object.

In addition to searching the associated data store using identified features for a candidate object, the computer vision system may also search based on data derived from at least one element of the detected candidate object 12. For example, a search may involve comparing data relating to both at least one feature and at least one element of the detected candidate object with characteristics of the object templates, such as 3D models, neural network weights, sets of images, eigenimages or other forms.

At step S105, it is determined whether an object in the associated data store that matches the candidate object has been identified. If the candidate object 12 does not match any of the objects for which data is stored in the at least one associated data store of pre-specified objects, the computer vision system is not currently able to identify the candidate object 12.

There may be a need to receive one or more further object templates from a further data store (herein also referred to as a non-associated data store) and then store the one or more further object templates in the (associated) object data store. When a detected candidate object is not identified using the associated data store of pre-specified object templates, the computer vision system attempts to identify the object using data stored in at least one non-associated data store. However, the computer vision system may not initially have access to or be aware of the presence of an appropriate non-associated data store storing the relevant object templates. To identify such a non-associated data store, the computer vision system determines at step S106 whether any elements of the object detected during step S102 contain an indication of a source of object data, such as object templates. In an example, the computer vision system determines whether a computer vision code was detected that contains a link, such as a URL, to a non-associated data store. Additionally, or alternatively, recognition of other objects, or the environment itself may be used to provide a hint or suggestion of a starting point for a further search (e.g. environment=refrigeration device, search food products).

The ability to search data stores which are not proprietary to the computer vision system and/or not associated with the computer vision system improves the overall ability of the computer vision system to identify detected objects. This is because the system can access a wider range of data object templates to identify objects.

The one or more non-associated, or further, data stores may be stored remotely from the computer vision system and accessed via a network. For example, the non-associated data stores may be accessed over the internet by the computer vision system. In some embodiments the system may not know where to search for further data stores and accesses a search engine to identify potential data stores to access. In other words, interrogating the further data store may comprise using the identifier search data to perform a web-search to identify the further data store to access.

A first type of non-associated/further object data store may be configured to store additional object templates describing objects in a manner that can be interpreted by the computer vision system—in a similar manner to the object templates stored in associated data stores of the computer vision system. However, the computer vision system may not initially have an association with, or access to, the further object data store or the object templates and thus cannot initially make use of the additional object templates until they have been identified—for example in the above-referenced object elements. For example, the further object data store may be remote to the computer vision system and located at an IP address unknown to the computer vision system.

It is desirable for the computer vision system to be provided with additional object templates from the non-associated/further object data store or provided with access to the non-associated/further object data store to obtain a copy of relevant object templates from the data store. These additional object templates enable the computer vision to perform identification of objects described by those additional object templates.

If at step S106 no indication of a source of object data stored in the form of a non-associated data store has been identified (either from accessing other such data stores or as a result of a search producing no data stores to access), the method proceeds to step S108 at which it is determined that the candidate object cannot be identified. If at step S107 a source of object data has been indicated in an element of the candidate object, the computer vision system accesses the source of object data (e.g. the non-associated data store) and access object data stored thereon.

The accessing may involve downloading object template data, such as primary and secondary object data associated with respective objects. The object template data may then be stored in an associated data store associated with the computer vision system. Alternatively, the previously non-associated data store may become an associated data store and thus may be accessible by the computer vision system.

The newly acquired object data from the non-associated data store can be searched in an additional attempt to identify the candidate object. If the object has been identified based on the newly acquired object data, the method proceeds to step S109.

At step S109, primary object data and/or secondary object data for the object corresponding to the matching object template is obtained. The primary and/or secondary object data for the object may be provided to a further application requesting the data. The precise nature of the object data provided to a further application will depend on the requirements of the application and the requirements of the computer vision system.

A non-associated/further object data store may store data items in many different data formats. The items may be a plurality of images, but may also be other data formats such as text, machine-readable elements, etc. In addition, a non-associated data store may store any combination of data formats, such as a combination of images, text, machine-readable elements, etc. The non-associated data store may additionally or alternatively store other types of data (a 'second type') that could be searched to enable identification of an object. For example, the computer vision system could perform a search of an image database to attempt to obtain data that enables identification of an object detected by the computer vision system.

In one example, an object detected by a computer vision system (such as object 12 in FIGS. 1 and 2a, 2b) may not be identified in the at least one associated data store. The computer vision may then request that a search is performed to compare elements/identifiers of the detected object with data items stored in the non-associated/further object data store. The data items may comprise a plurality of images, a plurality of text items, a plurality of machine-readable elements etc., or any combination thereof. If features of object 12 indicate a match between one or more of the plurality of items stored in the at least one non-associated data store, the system is able to identify the object 12. In other embodiments, the identifiers may relate to other objects in the environment or the environment itself to assist in determining a further data store to access.

The computer vision system may detect one or more features of the candidate object 12 and/or one or more elements of the detected candidate object 12. The computer vision system initiates a search of the at least one non-associated data store, based on at least one detected feature of the object 12. For example, the computer vision system may conduct a search of the at least one non-associated data store to identify a match to the overall shape of the detected candidate object 12 (either including or excluding the colour (s) of the object 12), such that the overall shape of the detected object 12 is compared with a plurality of images in the at least one non-associated data store of the second type.

Alternatively, or in addition, the computer vision system may initiate a search of based on at least one detected element of the detected object 12. For example, the computer vision system may conduct an image search of the at least one non-associated data store using the detected logo 14, such that the logo 14 of the detected object 12 is compared with a plurality of data items (such as images) stored in the non-associated data store. In another example, the computer vision system may conduct a text search of the at least one non-associated data store of the second type, using detected text 16, such that the text 16 of the detected object 12 is compared with the plurality of text items stored in the non-associated data store. In another example, the computer vision system may conduct an image search of the at least one non-associated data store of the second type, using a detected machine readable identifier, e.g. the detected bar code 18, as the search term, such that the bar code 18 of the detected object 12 is compared with a plurality of machine-readable element items stored in the non-associated data store. A bar code may also be used, for example, to identify a non-associated data store of the first type.

The non-associated data stores of the second type may comprise a plurality of items of one or more data format, such as a combination of images, text, machine-readable elements, etc. When an image related to the detected object 12 is used as the search term, only the image items stored in the non-associated data stores may be searched, when text is used as the search term only the text items stored in the non-associated data stores may be searched, when a machine-readable element is used as the search term only the machine-readable element items stored in the non-associated data stores may be searched, etc.

According to one embodiment, the computer vision system may initiate a search of the at least one non-associated data store of the second type automatically when an object is not identified using an associated data store. In some examples, the computer vision system may initiate a search of the at least one non-associated data store of the second type if an identification of a computer vision code to identify a non-associated data store of a first type has been unsuccessful.

The computer vision system may initiate a search of the at least one non-associated data store of the second type based on one or more of the detected features of the object 12 alone or in combination with one or more of the other detected features of the object 12 and/or one or more of the detected elements of the object 12. The computer vision system may also initiate a search of the at least one non-associated data store, based on one or more of the detected elements of the object 12 alone or in combination with one or more of the other detected elements of the object 12 and/or one or more of the detected features of the object 12.

FIG. 3 illustrates a flow diagram of a method for identifying detected objects. The method starts at step S100. At step S101 image data of a scene is acquired and processed. The image data of the scene is processed to detect objects in the scene at step S102. The process flow for detecting objects from captured image data may include one or more of low-level feature extraction, high-level feature extraction, segmentation, and detection. This processing may include the identification of lines, edges, ridges, corners, blobs, textures, shapes, gradients, regions, boundaries, surfaces, volumes, colours, shadings etc., within the scene. From these features, it may be possible to detect objects that are present within the scene, as set out at step S102. At step S103 at least one feature and/or element of the detected object(s) is detected (if present). Steps 101, 102 and 103 may be performed at substantially the same time. The process of detecting objects within a scene is well known to a person skilled in the art of computer vision systems and therefore is not discussed in further detail.

One or more associated data stores of pre-specified object templates are searched at step S104 to identify the detected object(s). The search of the associated data stores may be based on one or more detected features of the object, such as the detected shape and/or the detected colour(s) of the object, and/or of one or more detected elements of the object, such as the detected logo and/or the detected text and/or the detected bar code etc. For example, a search of the associated data store may be conducted, using the a feature of the detected object as the search term. The feature of the detected object may be compared with the plurality of object templates stored in an associated data store, and when it is determined from the comparison that the detected object matches one of the plurality of exemplars, an identification of the object can be made.

At step S105 it is determined whether the object has been identified by the search of the one or more associated data stores. If the detected object has been identified at step S105, the computer vision system obtains primary object data regarding the identified object at step S109. The primary object data may be stored in the associated data store which is searched in order to identify the object, or in another associated data store. The process ends at step S110.

However, when the detected object has not been identified at step S105, for example when the detected object does not match any of the plurality of exemplars/templates stored in the one or more associated data stores of pre-specified objects, a search of one or more non-associated data stores is performed at step S106. The search of the non-associated data stores may be based on one or more detected features of the object and/or one or more detected elements of the object. When the search results for the non-associated data stores identifies the detected object, for example, when the search returns one or more items matching the search term, then the detected object has been identified at step S107. The computer vision system obtains the primary object data regarding the identified object at step S109. The primary object data may be stored in the non-associated data store which is searched in order to identify the object, or in another non-associated data store. The process ends at step S110.

According to one embodiment, the computer vision system may infer the object data regarding the object from the search results, e.g. on the basis that a majority of the hits related to one particular object/object type. According to another embodiment, the computer vision system determines the object data from the search results.

When the search of the one or more non-associated data stores does not identify the detected object, then the detected object has not been identified at step S107.

An "unidentified object" message is generated at step S108 and the process ends at step S110.

According to one embodiment, the step S103 of detecting at least one feature and/or element of the detected object(s) may comprise only detecting one or more feature of the detected object(s). The search of the associated data stores and/or the non-associated data stores may be performed based only on the detected features of the unidentified object.

According to another embodiment, the step S103 of detecting at least one feature and/or element of the detected object(s) may comprise only detecting one or more element of the detected object(s). The search of the associated data stores and/or the non-associated data stores may be performed based only on the detected elements of the unidentified object.

Although the above method describes searching associated data stores at step S104 prior to searching non-associated data stores at step S106, the associated data stores and the non-associated data stores may be searched at substantially the same time.

As stated above, a non-associated data store is any repository which keep and manages collections of data, where the data has not been identified for use by a computer vision system. One example of a non-associated data store is the internet. The computer vision system may initiate a search of the internet, based on one or more of the detected features and/or one or more of the detected elements of a detected object, when the object is not identified using an associated data store. For example, with reference to FIG. 2A, the computer vision system may initiate a search of the internet, using the detected logo 14 of the object 12 as a search term and/or the detected text 16 as a search term, in order to identify the object 12 as a bottle of shampoo of a particular brand. The search may be performed as an image search and/or a text search depending on the feature/element which is used as the basis for the search. The detected feature/element may be compared with a plurality of images/text, and when one or more matches for the detected feature/element are returned, the computer vision system obtains primary object data regarding the object. For example, the computer vision system may infer from the search results, a name or other identifier for the object.

When an object is identified using a non-associated data store, the computer vision system may request confirmation from a user that the detected object 12 is the object identified using a non-associated data store. According to one embodiment, when the user confirms the identification of the object 12, a copy of the identified object 12 together with its object identifier (primary object data) is saved to the associated data store of the computer vision system, such that the computer vision system learns the identification of object 12. Consequently, when the computer vision system next detects the object 12, it will be able to identify the object 12 using the associated data store.

According to another embodiment, when an object is identified using a non-associated data store, a copy of the identified object 12 together with its object identifier (primary object data) is saved to the associated data store of the computer vision system, such that the computer vision system learns the object, without confirmation from a user being requested.

The computer vision system may determine a "confidence" rating associated with each object identified using a non-associated data store. The computer vision system may request confirmation from a user that the detected object 12 is the object identified using a non-associated data store when the confidence rating is below a predetermined threshold. An example of a confidence rating predetermined threshold is 70%. When a determined confidence rating associated with an object identified using a non-associated data store is greater than the predetermined threshold (i.e. >70%), the computer vision system does not request user confirmation that the detected object 12 is the object identified using a non-associated data store. A copy of objects identified using a non-associated data store and having an associated confidence rating greater than the predetermined threshold may be saved to the associated data store of the computer vision system, together with its object identifier (primary object data), such that the computer vision system learns the object.

When a determined confidence rating associated with an object identified using a non-associated data store is less than or equal to the predetermined threshold (i.e. ≤70%), the computer vision system requests user confirmation that the detected object 12 is the object identified using a non-associated data store. Following user confirmation, a copy of the object identified using a non-associated data store, together with its object identifier (primary object data) may be saved to the associated data store of the computer vision system, such that the computer vision system learns the object.

A copy of the object identified using a non-associated data store may be saved to the associated data store of the computer vision system, together with its object identifier (primary object data) and its associated confidence rating, such that the computer vision system learns the object.

Figure 4:
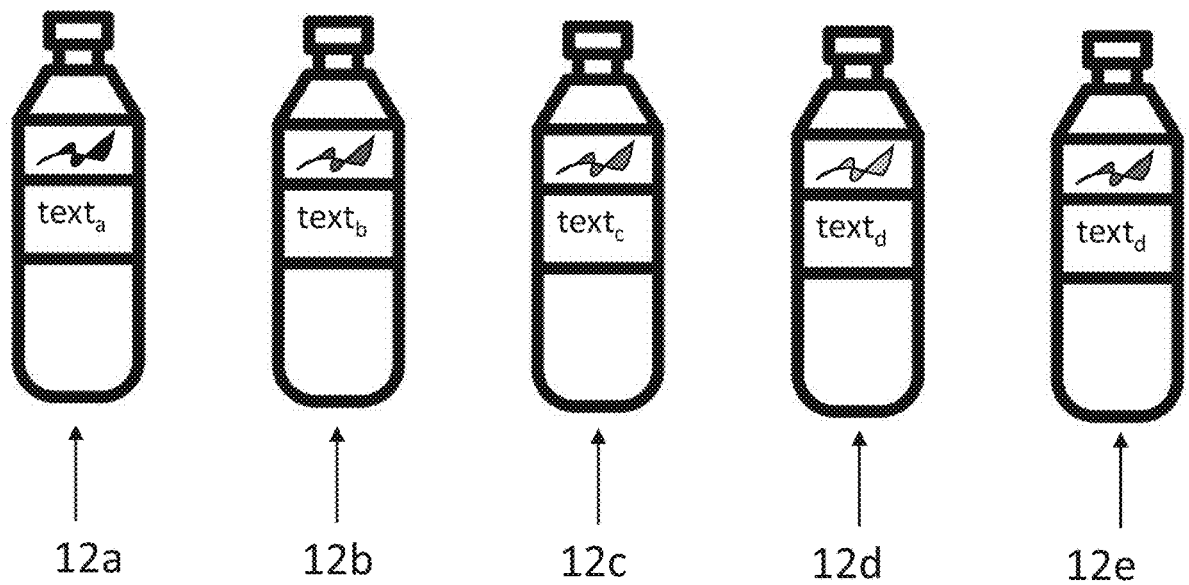
FIG. 4 illustrates a plurality of different objects 12A, 12B, 12C, 12D, 12E.

The computer vision system may receive search results from the non-associated data store identifying more than one object as a possible match for the detected object 12. For example, FIG. 4 illustrates a plurality of different objects 12A, 12B, 12C, 12D, 12E which have been returned following a search of at least one non-associated data store when the detected overall shape of the object 12 was used as the search term. According to one embodiment, when the computer vision system receives more than one possible match to the detected object 12, following a search of a non-associated data store, the computer vision system requests confirmation from a user as to which of the returned objects, for example 12A, 12B, 12C, 12D, 12E, is the detected object 12. Following confirmation by a user as to which of the returned results (if any) matches the object 12, the computer vision system is able to identify the object and acquire primary object data regarding the object. According to one embodiment, a copy of the identified object, together with its object identifier (primary object data), may be saved to the associated data store of the computer vision system, such that the computer vision system learns the object.

According to one embodiment, when a copy of the identified object is saved to the associated data store, the identified objects primary object data may be saved to the same associated data store or a different associated data store. However, in both instances, the computer vision system learns the object and is able to identify the object using the associated data store when the object is next encountered.

When the computer vision system receives search results from the non-associated data store(s) identifying more than one object as a possible match for the detected object 12, the computer vision system may perform a refined search. The computer vision system searches the possible match results using one or more other detected feature/element of the detected object as the search term. For example, referring to the detected object 12 of FIG. 1 and the possible match results of FIG. 4, the computer vision system may perform a search of the possible match results using the colour of the object 12 as the search term. The detected object 12 has a blue, white and green colour, therefore following a search of the possible match results using the colour of the object 12 as the search term the objects 12A and 12D are possible match results. A further refined search of the possible match results using one or more other detected feature/element of the detected object as the search term, such as the image of leaves of the object 12 may be performed, until the object 12 is identified. Once the object 12 has been identified, the computer vision system is able to acquire primary object data regarding the object.

As stated above, the computer vision system may detect elements of a detected object and perform a search of a non-associated data store using the detected element as the search term. The computer vision system may determine when the detected element is a machine-readable element. A machine-readable element comprises a machine-readable representation of data containing information about the object to which it is attached. For example, with reference to FIG. 2B, the computer vision system may determine that the detected element 18 is a machine-readable element, such as a barcode. A non-exhaustive list of machine-readable elements which the computer vision system is capable of detecting comprises: barcodes; EAN numbers; QR codes; microchips; embedded microchips; URL's/website addresses etc. According to one embodiment, a 2D bar code encodes a URL/website address.

When the computer vision system determines that a detected element is a machine-readable element, the computer vision system may perform a search of one or more non-associated data stores using the detected machine-readable element as the search term, in order to identify the detected object 12. According to one embodiment, the non-associated data store may comprise a plurality of machine-readable elements of the same type, such as a data store of barcodes. The manufacturer of the object (i.e. shampoo bottle 12) may provide a data store of their products, searchable using the object's machine-readable element as the search term, that can be used by any computer vision system in order to identify the object 12.

The computer vision system is not a barcode scanner, in that the objects are not scanned, instead the computer vision system identifies that an element of the object is a machine-readable element, and then performs a search of one or more non-associated data stores using the object's machine-readable element as the search term in order to identify the object.

As stated above, a machine-readable element may comprise a URL/website address provided on the detected object which the computer vision system is attempting to identify. The computer vision system may detect and decipher the optical characters of the URL/website address. The computer vision system then performs a search of one or more non-associated data stores using the object's machine-readable element (the deciphered URL/website address) as the search term. The non-associated data store may be the internet. The URL/website address is provided on the object by the object manufacturer and or distributor etc., such that accessing the URL/website address provides the computer vision system with the object's primary object data, such as the name of the object.

The computer vision system may also process an image and detect an object as well as an element associated with the object (such as QR code applied to the object). The computer vision system may be unable to identify the object following searches of the one or more associated and non-associated data stores of pre-specified objects based on the object features. For example, the object may be a difficult-to-recognise object. However, the computer vision system, is able to identify the object following searches of the one or more associated and/or non-associated data stores of pre-specified objects based on the detected element(s) associated with the object. The computer vision system identifies the element in a non-associated data store and then is able to retrieve object data, for example, a template of the object, which may be used by the computer vision system to identify and interpret the object to which the element is associated. The object element, the QR code, may be embedded with a hyperlink which directs the computer vision system to the object data.

Once the object has been identified, whether using an associated data store, or using a non-associated data store, secondary object data may be obtained regarding the identified object. The secondary object data comprises information about the object which enables the computer vision system to better understand and interpret the object.

A non-exhaustive list of secondary object data comprises: object type; object model; object orientation; object handling points; an object interpretation model; a model specification such as a visual schema of the object; the object's size, for example a 200 ml bottle etc.; dimensions of the object; a 3D model of the object; data regarding a product within the object; the object's manufacturer; the object's distributor; the object's production identifier; data regarding how to determine a level of product within the object; a best before/expiry date of the object/of a product within the object; an expected aging curve of the object/of a product within the object; communication information to establish a communication link with the object; data for determining when the object is opened/closed; data defining operation of the object's cap; data specifying the inanimate nature of the object; recipe suggestions using a product within object (for example, when the product is a food product); a user interface API; graphical specifications; an interpretive model for inferring best-before-date from a visible ageing indicator; a list of locations of similar or alternative objects; an application-specific feature-detection algorithm; an object-history log etc. The secondary object data may comprise one or more of the secondary object data described above in any combination.

Figure 5:
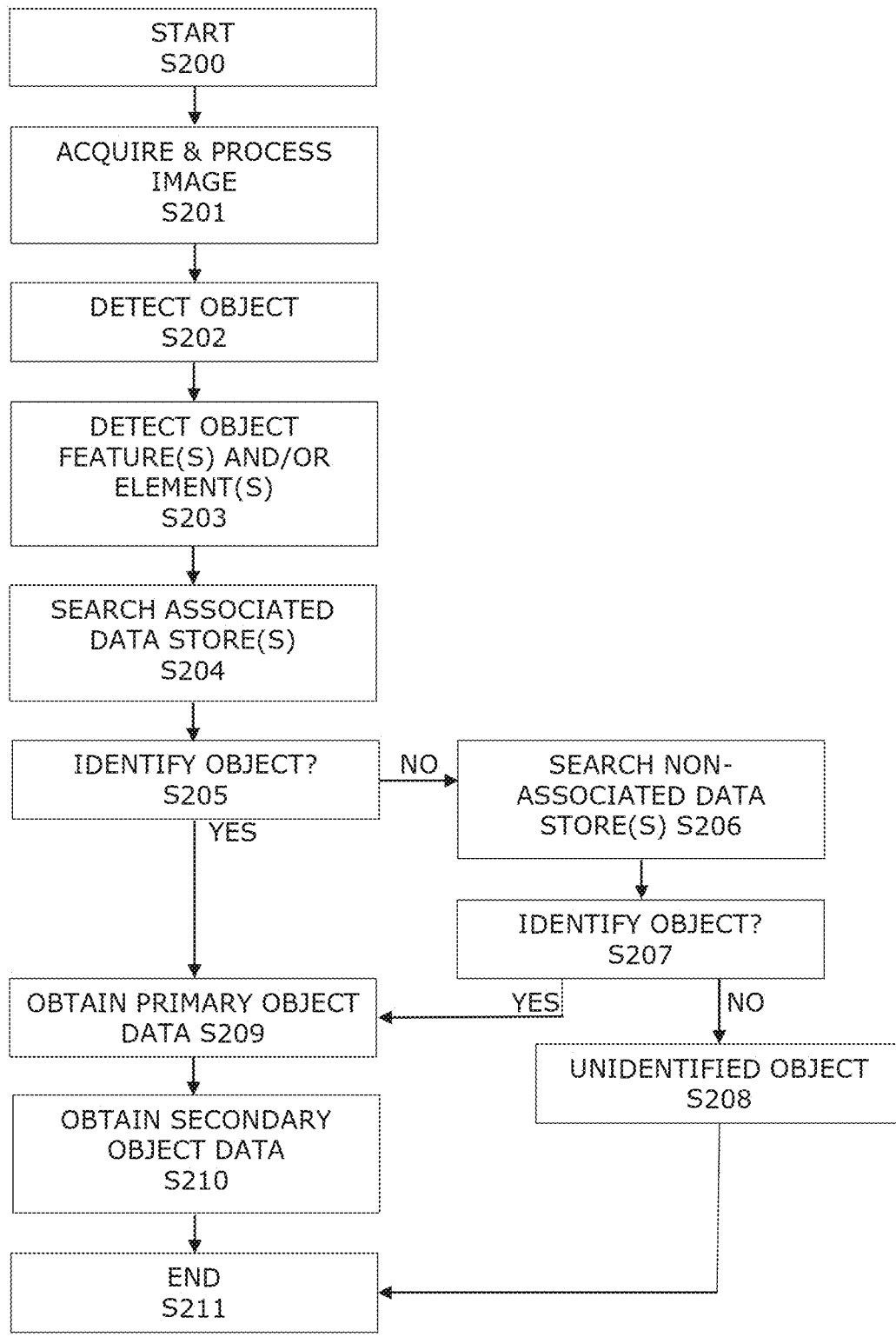
FIG. 5 illustrates a flow diagram of a method for identifying detected objects and retrieving secondary information.

FIG. 5 illustrates a flow diagram of a method for identifying detected objects and retrieving additional information about the detected object. The method starts at step S200. At step S201 an image is acquired and processed. The image is processed and lines, edges, ridges, corners, blobs, textures, shapes, gradients, regions, boundaries, surfaces, volumes, colours, shadings etc., within the image are determined so that at least one object within the image can be detected (if present) at step S202. At step S203 at least one feature and/or element of the detected object(s) is detected (if present). Steps 201, 202 and 203 may be performed at substantially the same time. The process of detecting objects within an image is well known to a person skilled in the art of computer vision systems and therefore is not discussed in further detail.

One or more associated data stores of pre-specified objects are searched at step S204 to identify the detected object. The search of the associated data stores may be based on one or more detected features of the object, such as the detected shape and/or the detected colour(s) of the object, and/or of one or more detected elements of the object, such as the detected logo and/or the detected text and/or the detected bar code etc. For example, an "image search" of the associated data store may be conducted, using the image of the detected object as the search term. The image of the detected object may be compared with the plurality of different exemplars stored in the associated data store, and when the detected object matches one of the plurality of exemplars, it is possible to identify the object.

At step S205 it is determined whether the object has been identified. When the detected object has been identified at step S205, the computer vision system may obtain primary object data regarding the identified object at step S209. The primary object data is used to identify the object. A non-exhaustive list of primary object data comprises: the name of the object; an object identifier, an object type identifier etc. The primary object data may be stored in the associated data store, which is searched in order to identify an object or object type or in another associated data store.

However, when the detected object does not match any of the plurality of exemplars stored in the associated data store(s) of pre-specified objects, then the object has not been identified at step S205.

A search of one or more non-associated data stores is performed at step S206. The search of the non-associated data stores may be based on one or more detected features of the object, such as the detected shape and/or the detected colour(s) of the object, and/or of one or more detected elements of the object, such as the detected logo and/or the detected text and/or the detected bar code etc. When the search results for the non-associated data stores identify the detected object, for example, when the search results in one or more items matching the search term, then the detected object has been identified at step S207. The computer vision system may then obtain primary object data regarding the identified object, such as the name of the object and/or an object identifier etc. at step S209.

When the search results for the non-associated data stores do not identify the detected object, then the detected object has not been identified at step S207. An "unidentified object" message is generated at step S208 and the process ends at step S211.

The step S203 of detecting at least one feature and/or element of the detected object(s) may comprise only detecting one or more features of the detected object(s). The search of the associated data stores and/or the non-associated data stores may be performed based only on the detected features of the unidentified object. Additionally, or alternatively, the step S203 of detecting at least one feature and/or element of the detected object(s) may comprise only detecting one or more element of the detected object(s). The search of the associated data stores and/or the non-associated data stores may be performed based only on the detected elements of the unidentified object. Although the above method describes searching associated data stores at step S204 prior to searching non-associated data stores at step S206, the associated data stores and the non-associated data stores may be searched at substantially the same time. Following identification of the object, regardless of whether the object is identified using the associated data store(s) or non-associated data store(s), it is possible to retrieve secondary object data regarding the identified object at step S210.

The computer vision system uses the primary object data and/or the detected machine-readable element as a search term for searching one or more non-associated data stores to locate and download the secondary object data. A detected machine-readable element, such as a URL, may resolve to the primary and secondary object data regarding the identified object, and therefore can be used to identify the object as well as to retrieve the secondary object data for the object. The secondary object data is provided to assist the computer vision system with its interpretation of the object, as well as its interpretation of the scene within which the object has been detected. According to one embodiment, the secondary object data, such as the model specification(s), object interpretation model(s) etc. are designed to work together with the computer vision system. The secondary object data may be provided by the manufacturer of the object.

Returning to the example of FIGS. 2A and 2B, once the object 12 has been identified as a bottle of shampoo of a particular brand, the secondary object data, such as a model specification for the object can be obtained. The secondary object data may be used to enrich the computer vision systems interpretation of the object. When a search of the non-associated data stores returns more than one possible match for the unidentifiable object, the computer vision system may download secondary object data, such as the model specifications of one or more of the possible matches for the unidentifiable object (for example the top 3 results), and compare the downloaded model specifications with the unidentifiable object to determine if any of the possible matches are the unidentifiable object. Following determination that one of the possible matches is the unidentified object, the primary object data and further secondary object data (if available) is retrieved.

Once the secondary object data has been retrieved at step S210, the process ends at step S211.

As previously set out above, the object may comprise a machine-readable element such as a microchip and the computer vision system receives via a wireless data channel, such as BLE, a message providing a URL for the unidentified object from the microchip. The URL resolves to secondary object data, such as a visual schema file, when the URL is used as the search term and a non-associated data store, such as the internet is searched. By downloading the visual schema file, the computer vision system is able to recognise and interpret the object to which the microchip is attached.

When the unidentified object is a home appliance, for example, comprising a machine-readable element such as a URL (either provided on the home appliance or discernible from a microchip), the URL may link to secondary object data, such as a user interface for the home appliance. According to this embodiment, the computer vision system may order more of a product which is running low, for example, when the home appliance is a refrigerator, or may access and overlay the appliance user interface if it is an AR system.

Figure 6:
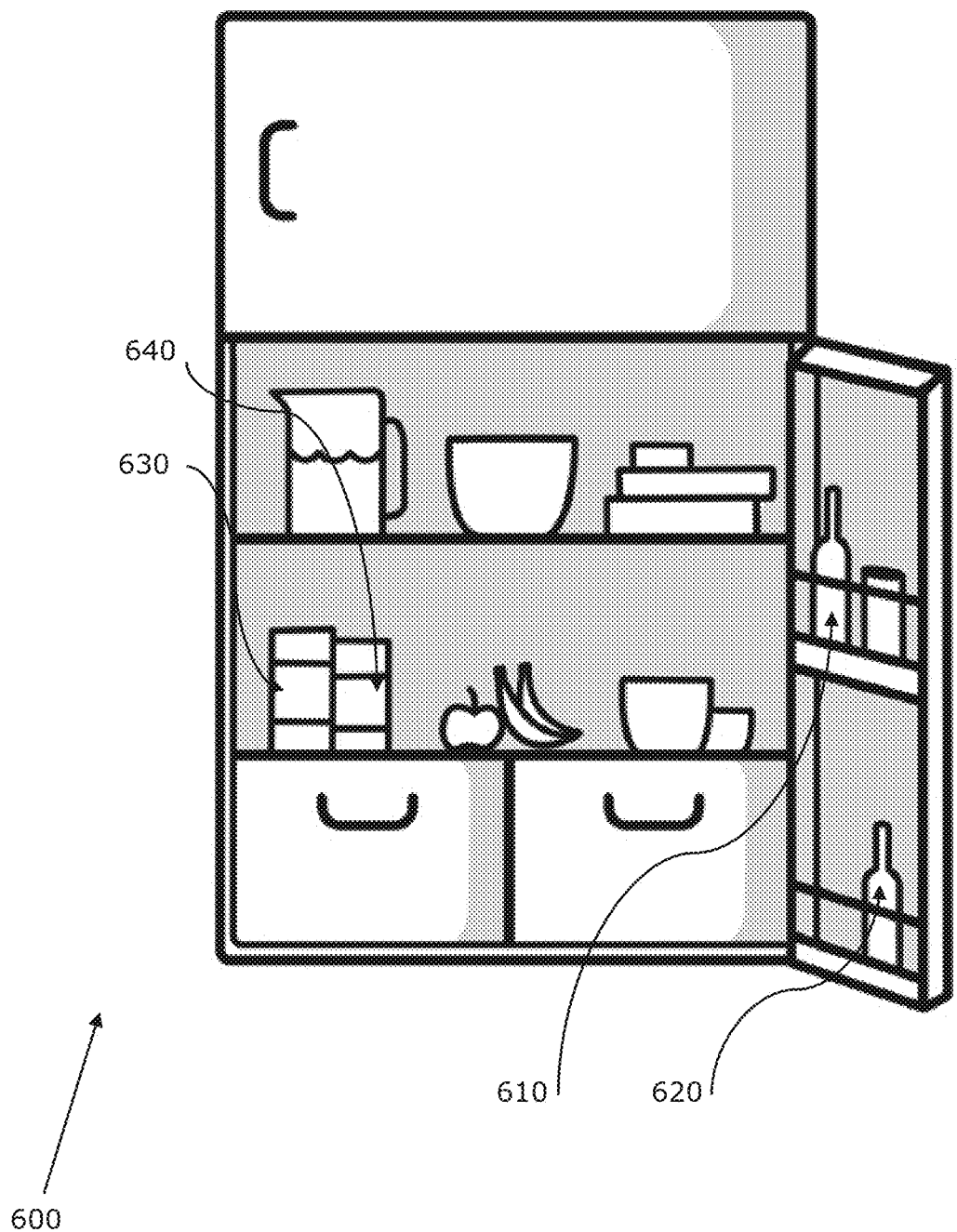
FIG. 6 illustrates a refrigerator and its contents.

A computer vision system may be used to observe a refrigerator's contents for example. FIG. 6 illustrates a refrigerator and its contents. The computer vision system is built into the refrigerator (not illustrated). The computer vision system uses the above described combination of associated and non-associated data stores in order to identify the contents of the refrigerator 600, such as the cans of a bottle of wine of a particular brand 610, the bottle of milk 620, the packet of cheese of an other brand 630, the carton of chilled vegetables 640 etc. Following identification of the objects 610, 620, 630, 640 etc. within the refrigerator 600, the computer vision system downloads secondary object data for the objects 610, 620, 630, 640 which have been identified. Using the secondary object data, the computer vision system may maintain a list of objects 610, 620, 630, 640 in the refrigerator 600, and information about them, including their current status, e.g. their location within the refrigerator 600 and the amount of product left in the packaging, which is determined using data provided by secondary object data. The current best-before date of an object based on an ageing model may be provided as part of the secondary object data augmented with other data relevant to the object and refrigerator, such as provided by smart packaging of the object which provides temperature reading and/or chemical sensor reading to the computer vision system, and/or refrigerator data, such as the temperature inside the refrigerator provided by sensors in the refrigerator 600. This data may be provided to the computer vision system via a communication link established between "smart" objects within the refrigerator and the computer visions system. The communication information to establish the communication link with the object being provided as part of the secondary object data.

Figure 7:
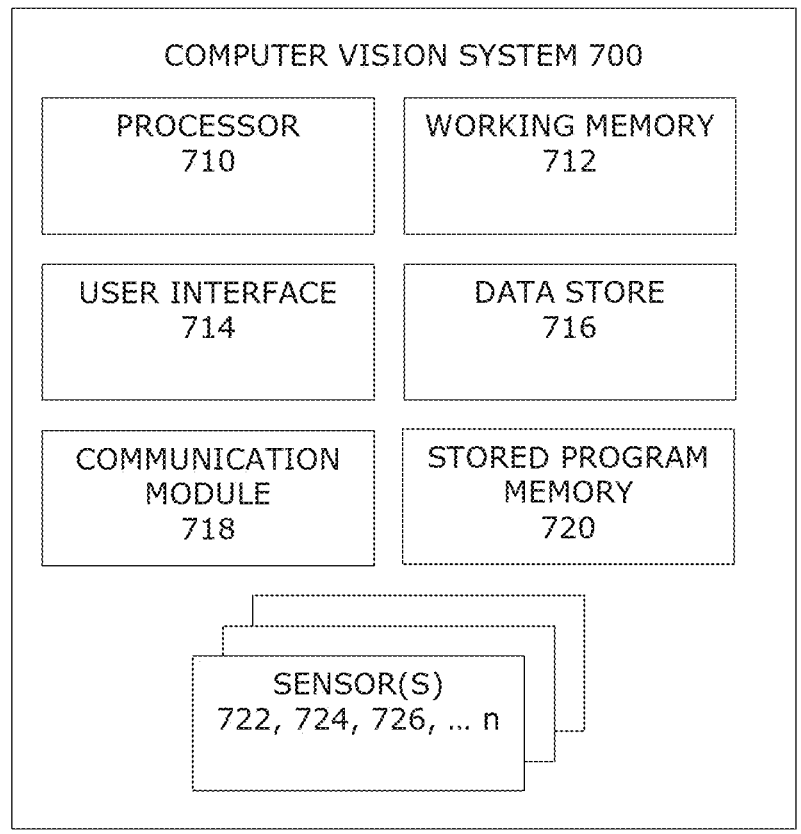
FIG. 7 illustrates a block diagram of a computer vision system.

FIG. 7 illustrates a block diagram of a computer vision system 700. The computer vision system 700 comprises at least one processing element processing element 710, at least one working memory 712, at least one user interface 714, at least one data store 716, such as an associated data store, at least one communication module 718, at least one stored program memory 720, and at least one sensor 722, 724, 726, . . . n.

The at least one sensor 722, 724, 726, . . . n may comprise image acquisition devices as well as other types of sensors. For example, the at least one sensor 722, 724, 726, . . . n may comprise cameras, light-sensitive cameras, charge-coupled devices (CCD's), range sensors, tomography devices, radars, ultra-sonic cameras, temperature sensors, etc.

In such a processing system the at least one processing element 710 is coupled to the working memory 712 and the stored program memory 720. The stored program memory 720 may comprise computer program code to implement the object identification and acquisition of secondary object data described herein. The processing element 710 may comprise processing logic to process data (e.g. image data, programs, instructions received from a user, etc.) and generate output signals in response to the processing.

The user interfaces 714, may comprise a conventional computer screen, keyboard, and mouse, a touch screen and/or other interfaces. The communication module 718 may comprise a network interface and may be configured to transmit and/or receive data or data signals from one or more external devices (such as the above described non-associated data stores stored at a remote server or computing device). The communication module 718 may be a communication interface or unit.

The data store 716 may be a data store configured to store object identification data. The data store 716 may be coupled to the communication module 718 to, for example, receive object identification data. The data store 716 may be configured to communicate with the at least one processing element 710.

The working memory 712 and/or the stored program memory 720 and/or the data store 716 may comprise a volatile memory such as random access memory (RAM), for use as temporary memory. Additionally or alternatively, the working memory 712 and/or the stored program memory 720 and/or the data store 716 may comprise non-volatile memory such as Flash, read only memory (ROM) or electrically erasable programmable read only memory (EEPROM), for storing data, programs, or instructions received or processed by the processing element 710.

The data store 716 may be provided at the computer vision system 700, such as illustrated in FIG. 7, or may be provided remote from the computer vision system 700 and accessed via the communication module 718 over a network such as the internet.

The data store 716 comprises the associated data store, associated with the computer vision system 700. The data store 716 may comprise a data store of pre-specified objects which are searched when the computer vision system 700 is attempting to identify a detected object. The pre-specified objects are stored in a format that enables the computer vision system to compare the detected object with the objects stored in the data store 716 in order to identify the object, if present in the data store 716. When an object is unfamiliar (i.e. not in the data store), then the computer vision system is unable to identify that object. The computer vision system may communicate with the non-associated data store via the communication module 718. In some arrangements, the computer vision system may not perform the search of non-associated data stores and when a detected object cannot be identified using an associated data store, the computer vision system may upload data regarding the unidentified object, such as object features and or elements of the object etc. to a remote service, and the remote service performs a search of one or more non-associated data stores in order to identify the detected object. Identification data for the detected object, identifying the object, such as primary object data is then transferred to the computer vision system following identification of the detected object by the remote service. In addition, secondary object data may be transferred to the computer vision system following identification of the detected object by the remote service.

An object which has been identified using a non-associated data store, and learnt by the computer vision system, such that the object together with its primary object data is saved to the associated data store, may be shared with other computer vision systems. For example, the associated data store may be connected to a network, such that any objects learnt by a first computer vision system, may be uploaded to an associated data store, which may be accessed by a second and further computer vision systems. This is particularly useful for robotics in natural environments, where models of encountered objects may be learned in the field and uploaded for use and improvement by other robots.

Computer vision systems which are able to access non-associated data store(s) in order to identify detected objects could be used in robotic navigation, robotic interaction with an object, creation of informative augmented-reality overlays, automatic re-ordering of a product when nearly empty, or any other application of computer vision.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog or VHDL (Very high speed integrated circuit Hardware Description Language).

The program code may execute entirely at the computer visions system, partly on the at the computer visions system and partly on a remote computer or entirely on the remote computer or server. In the latter scenario, the remote computer may be connected to the computer visions system through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

The invention claimed is:

1. A method of identifying an object within an environment comprising:
   capturing visual data associated with the environment;
   comparing data defining a candidate object in the environment with an object data store storing object templates providing data pertaining to one or more objects;
   responsive to failing to match data defining the candidate object in the environment with an object template, identifying one or more indications of a source of object data disposed in the environment to identify a further object data store; and
   interrogatinge the identified further object data store to identify the candidate object.

2. The method of claim 1, further comprising responsive to matching the data defining the candidate object in the environment and an object template, identifying the candidate object.

3. The method of claim 1, further comprising receiving one or more further object templates from the further data store and storing the one or more further object templates in the object data store.

4. The method of claim 1, wherein the interrogating the identified further object data store comprises performing a web-search to identify the further object data store to access.

5. The method of claim 1, wherein at least one of the one or more indications is associated with the object to be identified.

6. The method of claim 1, wherein at least one of the one or more indications is associated with the environment in which the object is positioned.

7. The method of claim 1, wherein at least one of the one or more indications is associated with a further object within the environment.

8. The method of claim 1, wherein the object identifier comprises a machine-readable object identifier.

9. The method of claim 8, wherein the machine-readable object identifier is one of a bar code, a QR code, a data matrix code, a microchip, and/or a code defining a URL to access.

10. The method of claim 1 wherein the data defining the object comprises at least one of lines, edges, ridges, corners, blobs, textures, shapes, gradients, regions, boundaries, surfaces, volumes, colours, and shadings.

11. The method of claim 1 wherein the object templates comprise at least one of 3D models, neural network weights, sets of images, or eigenimages.

12. The method of claim 1, further comprising accessing the further object data store to retrieve secondary object data associated with the identified candidate object.

13. The method of claim 12, wherein the secondary object data comprises one or more of: object type; object model; object orientation; object handling points; an object interpretation model; a model specification of the object; a visual schema of the object; a size of the object; dimensions of the object; a three-dimensional model of the object; data regarding a product within the object; a manufacture of the object; a distributor of the object; a production identifier of the object; data regarding how to determine a level of product within the object; a best before/expiry date of the object/of a product within the object; an expected aging curve of the object/of a product within the object; communication information to establish a communication link with the object; data for determining when the object is opened/closed; data defining operation of a cop of the object; data specifying an inanimate nature of the object; recipe suggestions using a product within object; a user interface API; graphical specifications; an interpretive model for inferring best-before-date from a visible ageing indicator; a list of locations of similar or alternative objects; an application-specific feature-detection algorithm; an object-history log.

14. The method of claim 1, wherein the comparing comprises comparing one or more features of the candidate object with the objects templates to identify the object.

15. The method of claim 14, wherein the one or more features of the candidate object comprises one or more of: a detected shape of the object; at least one detected colour of the object.

16. The method of claim 1, further comprising presenting to a user, the data pertaining to the identified candidate object and/or the secondary object data.

17. The method of claim 1, further comprising associating a confidence rating with the identified candidate object.

18. The method of claim 17, further comprising storing the confidence rating in the object data store.

19. The method of claim 18, further comprising storing the confidence rating with the object template associated with identified object.

20. A non-transitory, computer readable storage medium comprising computer code for performing the method of claim 1 when the computer code is executed by a computer.

21. Apparatus configured to perform the method of claim 1.

* * * * *